(12) United States Patent
Rapp et al.

(10) Patent No.: US 6,244,495 B1
(45) Date of Patent: Jun. 12, 2001

(54) GRIPPER

(75) Inventors: Eberhard H. Rapp, deceased, late of Southington, CT (US), by Monika H. Rapp, executrix; Salvatore Corsino, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/187,511

(22) Filed: Nov. 6, 1998

(51) Int. Cl.$^7$ .................................................. B23K 37/04
(52) U.S. Cl. ........................ 228/44.3; 228/49.1; 29/889.21
(58) Field of Search ......................... 294/82.1; 414/266; 81/44; 29/560, 889.21; 228/44.3, 49.1; 269/234

(56) References Cited

U.S. PATENT DOCUMENTS

| 3,567,100 | 3/1971 | Farmer et al. | 228/2 |
| 3,698,617 | 10/1972 | Fukaya et al. | 228/2 |

(List continued on next page.)

FOREIGN PATENT DOCUMENTS

| 1293531 | 10/1972 | (GB) . |
| 1293532 | 10/1972 | (GB) . |
| 1385471 | 2/1975 | (GB) . |

OTHER PUBLICATIONS

"Metallurgia", Copyright 1990 FMJ International Publications Ltd., May, 1990, vol. 57, No. 5, p. 236, ISSN: 0141–8602, 3 pages.

"Linear friction welding joins noncircular sections", Advanced Materials & Processes, Feb. 1991, p. 47.

"Process Data Acquisition in Vibration Welding of Thermoplastics", Helmut Potente and Harald Kaiser, Polymer Engineering and Science, Mid–Dec., 1989, vol. 29, No. 23, pp. 1661–1666.

"Joining Titanium Aluminides", by Philip Threadgill, Aircraft Engineering, Apr. 1991, pp. 12–13.

Structure, Properties, and Fracture of Linear Friction Welded Al–Fe–V–Si Alloy 8009, H. H. Koo and W. A. Baeslack, III, Department of Welding Engineeriing, The Ohio State University, Columbus, OH 43210, Materials Characterization 28:157–164 (1992).

"Vibration Welding", A Materials Technology View of a Mass–production Method, A. K, Schlarb and G. W. Ehrenstein, Kassel, Kuntststoffe German Plastics 78, 1988, pp. 30–32.

Developments in Mechanics, vol. 14(a), Proceedings of the $20^{th}$ Midwestern Mechanics Conference, Sponsored by School of Mechanical Engineering, Purdue University, Aug. 31–Sep. 2, 1987, pp. 394–399.

"Vibration Welding: Fast, Quiet, Efficient . . . ", Assembly Engineering, Richard D. Holtz, Managing Editor, Jun., 1979, pp. 36–39.

(List continued on next page.)

*Primary Examiner*—Patrick Ryan
*Assistant Examiner*—Jonathan Johnson
(74) *Attorney, Agent, or Firm*—John Swiatocha

(57) ABSTRACT

A gripper for retaining a first element, such as a rotor blade, to a reciprocal motion assembly during friction welding includes a pair of clamp halves and a base. The base includes two spaced end walls. Upon joining the clamp halves together, around a collar on the first element, in the base the end walls compress the clamp halves both longitudinally and transversely, consequently causing the clamp halves to firmly grip the collar of the first element. Thus, the first element is securely held, while the motion provided by the reciprocal motion assembly is translated to the blade.

6 Claims, 2 Drawing Sheets

U.S. PATENT DOCUMENTS

| | | | |
|---|---|---|---|
| 3,711,009 | 1/1973 | Kuzuya et al. | 228/2 |
| 3,720,993 | 3/1973 | Farmer et al. | 29/470.3 |
| 3,771,706 | 11/1973 | Martens | 228/2 |
| 3,777,967 | 12/1973 | Searle et al. | 228/2 |
| 3,840,168 | 10/1974 | Searle et al. | 228/2 |
| 4,086,122 | 4/1978 | Bouyoucos et al. | 156/556 |
| 4,377,428 | 3/1983 | Toth | 156/73.5 |
| 4,811,887 | 3/1989 | King et al. | 228/2 |
| 4,844,320 | 7/1989 | Stokes et al. | 228/102 |
| 4,858,815 | 8/1989 | Roberts et al. | 228/2 |
| 4,864,706 | 9/1989 | Jenkel | 29/156.8 R |
| 4,873,751 | 10/1989 | Walker et al. | 29/156.8 B |
| 4,884,736 | 12/1989 | Goddard | 228/2 |
| 4,905,883 | 3/1990 | Searle | 228/2 |
| 4,995,544 | 2/1991 | Searle | 228/2 |
| 5,035,411 | 7/1991 | Daines et al. | 269/231 |
| 5,100,044 | 3/1992 | Searle | 228/112 |
| 5,109,606 | 5/1992 | DeMichael et al. | 29/889.1 |
| 5,113,583 | 5/1992 | Jenkel et al. | 29/889.21 |
| 5,148,957 | 9/1992 | Searle | 228/2 |
| 5,160,393 | 11/1992 | Snyder | 156/73.5 |
| 5,188,275 | 2/1993 | Daines | 228/2 |
| 5,197,190 | 3/1993 | Coolidge | 29/889.1 |
| 5,339,504 | 8/1994 | Thumm et al. | 29/48.5 A |
| 5,468,334 | 11/1995 | Searle | 156/580 |
| 5,486,262 | 1/1996 | Searle | 156/580 |
| 5,518,562 | 5/1996 | Searle et al. | 156/73.8 |
| 5,678,749 | 10/1997 | Pratt et al. | 228/2.1 |
| 5,813,593 * | 8/1998 | Glaske, Jr. | 228/112.1 |

OTHER PUBLICATIONS

"An Analysis of Vibration Welding", H. Potente, P. Michel and B. Ruthmann, Paderborn, Kuntststoffe German Plastics 77 (1987), pp. 31–34.

"Welding developments", Automotive Engineer, Oct./Nov., 1990, pp. 32–35.

"A Model for the Nonlinear Heat Transfer Process in the Early Stages of Vibration Friction Welding", by M. H. Attia and M. O. M. Osman, PED–vol. 54/TRIB–vol. 2, Tribological Aspects in Manufacturing, ASME, 1991, 7 xerox pages.

* cited by examiner

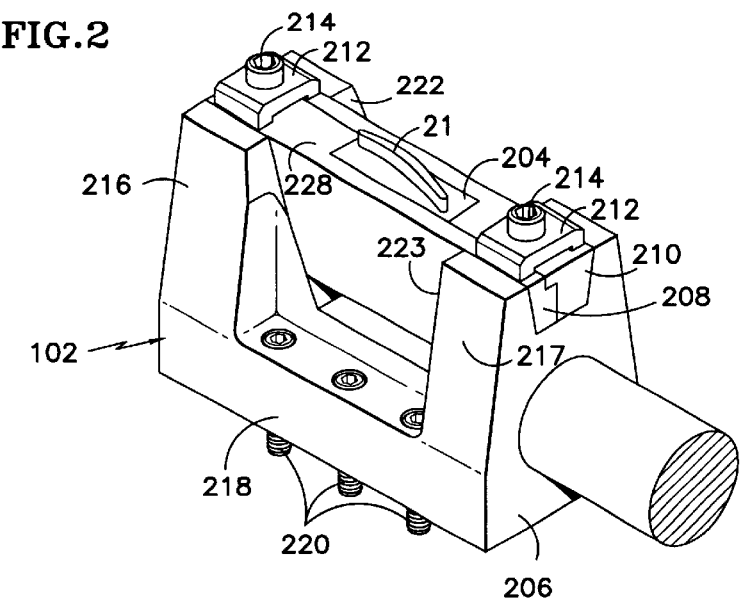
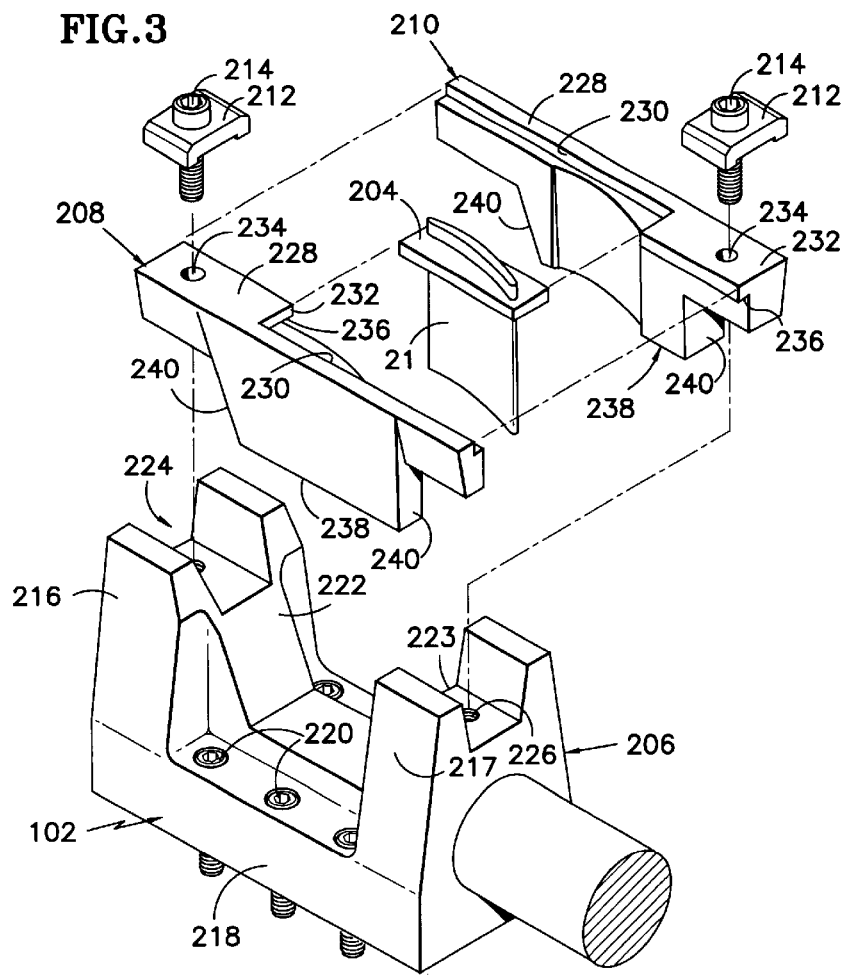

GRIPPER

CROSS-REFERENCES

The present application is related to the subject matter disclosed in copending U.S. patent application Ser. No. 09/187,073 filed on the same date as this application, entitled "Indexing Turret," as well as the subject matter disclosed in "Friction Welder." Both of these applications are incorporated herein by reference in their entirety.

TECHNICAL FIELD

This invention relates to friction welders, and more particularly to a gripper adapted to grip a first element such as a rotor blade while friction welding the first element to a second element or a rotor disk.

BACKGROUND OF THE INVENTION

Friction welding is a well-known process in which two components, moving relative to each other, are brought into contact under pressure and bonded at their interface. The motion at the weld interface may be rotational or non-rotational. Non-rotational motion includes linear, elliptical or vibratory motion. Friction welding by rotational motion typically requires at least one of the components be circular in cross-section. However, friction welding by non-rotational motion has received attention as a means of bonding components, where the weld interface of both parts is non-circular.

In non-rotational friction welding, one component is oscillated relative to the other component while a forge force is applied normal to the direction of motion. The motion is provided by a reciprocal motion assembly. The forge force moves the components into contact, and with metal components the friction between the components generates heat and plasticizes them. Once the motion stops, the metal solidifies, thus bonding the components.

One useful application of non-rotational friction welding is fabricating integrally bladed rotors for gas turbine engines. An integrally bladed rotor is a rotor assembly wherein the rotor blades are bonded directly to the rotor disk at spaced intervals about the circumference of the disk. In this way, individually manufactured components, each with selected properties, may be joined. The blades generally include a platform, an airfoil shaped midspan region extending from one side of the platform, and a stub region extending from the other side of the platform.

It will be appreciated that the conditions under which integrally bladed rotors are friction welded are stringent. In order to friction weld these components together the blades must be retained to the reciprocal motion assembly and firmly gripped with a holder (gripper). The disk must be held in a stationary position.

The blades are complexly shaped, therefore the gripper must have a compatible clamping mechanism. In addition, the blades may break relatively easily during welding, so the gripper must be able to support the blades in such a way as to minimize the likelihood of the blades breaking. Moreover, there are large forces associated with friction welding metal components. Typically, for metal components, the oscillation frequencies are less than about 100 Hz or cycles/second, depending on the part size and shape, and the forge forces are greater than 5000 lbs. force. Furthermore, numerous blades must be bonded to each disk within tight tolerances required for aerospace applications. Thus, the gripper must clamp tightly to withstand these forces and hold the blade so that the final position of the blade is accurate and repeatable consistently.

If the blade moves during welding, such movement risks damage to the friction welder. In addition, such movement risks not only misalignment of the blade being bonded, but misalignment of every subsequently joined blade. If misalignment is significant, the integrally bladed rotor cannot enter service, and will be scrapped or undergo costly reassembly. If misalignment is insignificant, the integrally bladed rotor may enter service but may have some resulting performance losses associated therewith. Furthermore, movement of the blade relative to the gripper is undesirable because any vibration of the blade absorbs energy and will increase the energy required to get proper oscillation of the blade.

Several possible grippers have been developed to hold the blades during friction welding. However, these prior art grippers fail to adequately meet the aforementioned needs. One solution is to form the blade within a solid stock of material, so that the blade remains integral with the block during bonding. In order to utilize this method the blade must be formed within a block of material by an expensive process and the block must be removed after joining. In a production environment it is faster and cheaper to manufacture the blades to their finished state and then join them to the disk.

Yet another solution is to form the blade with two holes therethrough. A U-shaped blade holder surrounds the midspan region of the blade and is bolted to the blade through the holes. The blade holder is then attached to the bonding machine. Using and removing this type of holder may be difficult where the geometry of the integrally bladed rotor requires the blades to be spaced closely together.

Another solution is to form the blade with a chamfered portion, and have the holder including a cavity and a clamping means with a chamfered end. When the blade is inserted into the holder the midspan region extends into the cavity, and the chamfered ends of the blade and holder mate. The chamfers of each element are such that when the clamping means is tightened its chamfered end forces the blade further into the cavity to minimize possible movement during welding. However using and removing this type of holder may be difficult where the geometry of the integrally bladed rotor requires the blades to be spaced closely together.

As a result of the above limitations of the holder discussed above, an improved gripper is sought, which holds the blade securely during subsequent friction welding to a rotor disk.

SUMMARY

It is therefore, a principal object of the present invention to provide an improved gripper for effectively retaining a first element to a reciprocal motion assembly and holding and protecting the first element during friction welding the first element to a second element. The improved gripper is able to withstand the large forces associated with friction welding metal components, and assures the process is accurate and consistently repeatable.

According to the present invention a gripper is disclosed, which retains to the reciprocal motion assembly, and holds a first element including a collar or platform. The gripper includes a U-shaped base and two clamp halves engageable with the base. The base includes two end walls spaced to accommodate the clamp halves therebetween. When the clamp halves are joined, the halves surround the collar of the first element. Upon insertion of the joined clamp halves in the base, the end walls compress the clamp halves longitudinally and transversely. Consequently, the clamp halves firmly grip the collar of the first element, so that the first element is securely held. Thus, the base firmly grips the clamp halves which consequently, firmly grip the collar of the first element, so that both the clamp halves and the first element are secure against movement.

BRIEF DESCRIPTION OF THE DRAWINGS

FIG. 2 is a perspective view of the gripper shown in FIG. 1.

FIG. 3 is an expanded/exploded view of the gripper shown in FIG. 1.

BEST MODE FOR CARRYING OUT THE INVENTION

Figure 1:
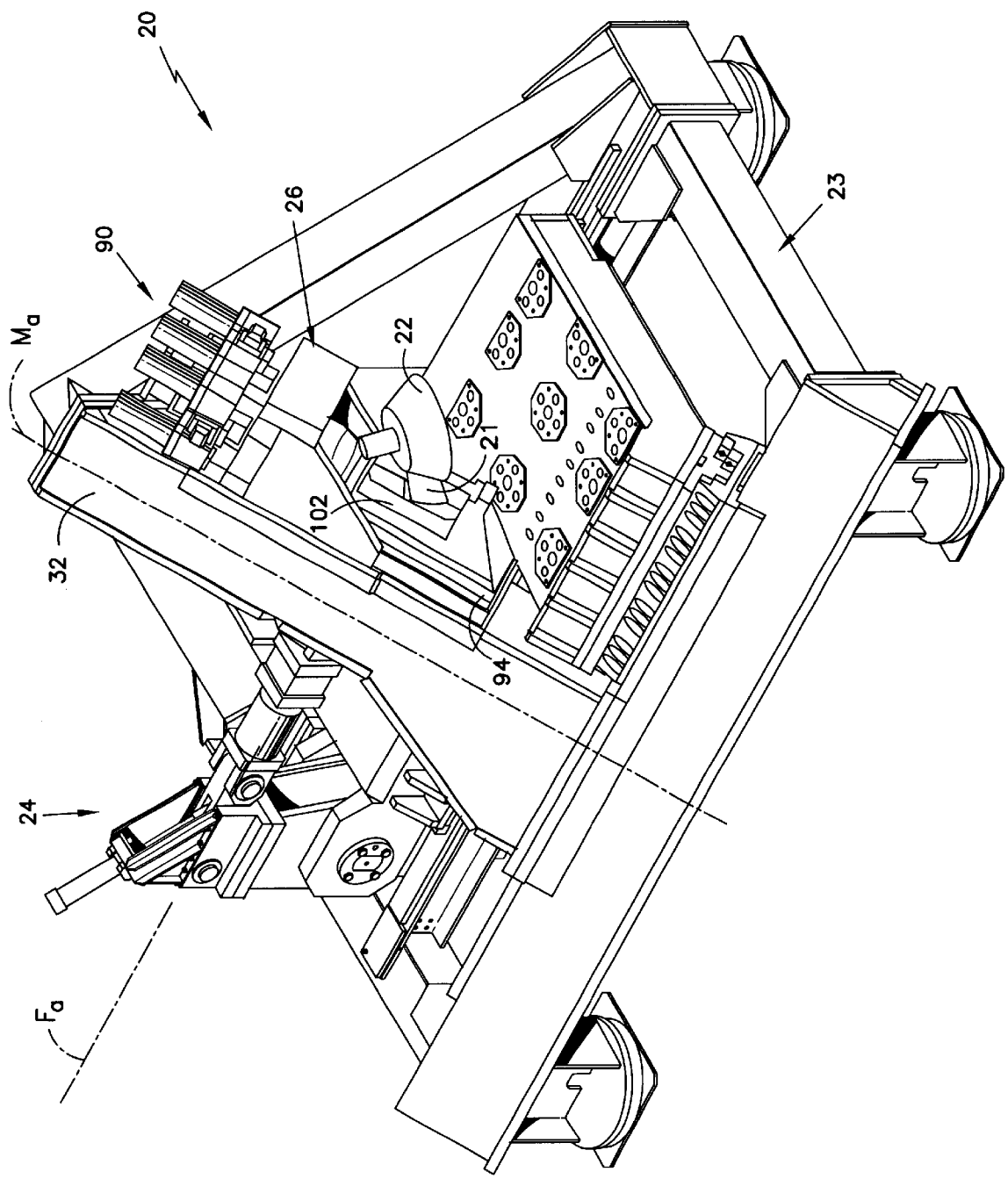
FIG. 1 a perspective view of a friction welder employing a gripper of the present invention connected thereto.

Referring to FIG. 1, the friction welder 20 is an apparatus for friction welding a first element 21 to a second element 22. An indexing turret (not shown) which in operation would hold the second element 22 in the illustrated position has been removed for clarity. In the illustrated application, the first element 21 is a rotor blade, or airfoil and the second element 22 is a rotor disk. Once all the rotor blades are welded to the rotor disk an integrally bladed rotor is formed.

The friction welder 20 generally includes a frame 23, a forge assembly 24, and a reciprocal motion assembly 26. The frame 23 includes a plurality of trusses, represented by the diagonal truss 32, which form a pyramid-like configuration. The forge assembly 24 is supported by the frame 23 and provides a forge load along a forge axis $F_a$. The reciprocal motion assembly 26 is supported by the frame 23, and is adapted to generate reciprocating motion between the first and second elements (blades and disks) 21 and 22, respectively. The reciprocal motion assembly 26 includes an hydraulic actuator assembly 90 and a slide 94. The slide 94 is slidingly engaged with the diagonal truss 32 of the frame 23. By means of the hydraulic actuator assembly 90 the slide is made to move along the motion axis $M_a$ in a linear reciprocating motion. The motion axis $M_a$ is perpendicular to the forge axis $F_a$. A gripper 102 is attached to the slide 94, and holds the first element 21, so that when the slide 94 is moved, the first element 21 also moves relative to the second element 22. Details of the structure and operation of the friction welder are set forth in U.S. patent application Ser. No. (Attorney Docket No. EH-9446) noted hereinabove.

Referring to FIGS. 2 and 3, the first element 21, which is characterized by an airfoil shaped portion disposed within a collar 204. The collar 204 should be shaped to allow no interference with other airfoils 21 which are subsequently bonded to disk 22. The gripper 102 includes a U-shaped base 206, a first clamp half 208, a second clamp half 210, a pair of straps 212, and a pair of fasteners 214. The U-shaped base 206 is engageable with the reciprocal motion assembly 26 (as shown in FIG. 1). The base 206 includes two spaced end walls 216 and 217 with a center wall 218 having attachment points 220 thereon. End wall 216 includes an inclined inner surface 222 and end wall 217 includes an upright (non-inclined) inner surface 223. Each end wall has a cutout 224 having inclined side walls in the free end thereof. The inner surfaces are spaced apart to accommodate the clamp halves 208 and 210 therebetween. At the base of each cutout 224, there are bores, represented by the bore 226 (FIG. 3). The gripper of the present invention is attached directly to the slide at attachment points 220 by a plurality of threaded bolts which extend through the center wall 218 of the base at points 220. Although threaded bolts are used, the present invention is not limited thereto.

The clamp halves 208 and 210 are substantially T-shaped. Each clamp half is characterized by an upper surface 228 with a shoulder 230. A cross bar 232 of each clamp half is provided with a bore 234 therethrough, and includes a flange 236. A vertically extending foot 238 of each clamp half is characterized by a pair of opposed outer surfaces 240.

Referring to FIG. 1, use of the gripper 102 will now be described. With the base 206 attached to the slide 94, and the friction welder 20 in an unloaded position, where the disk 22 is spaced from the base 206, the blade 21 is inserted in the gripper 102. Referring to FIGS. 2 and 3, the two clamp halves 208 and 210 are joined about the blade 21, so that the shoulders 230 fit snugly about the collar 204. Then the clamp halves 208 and 210, thus joined, are installed in the base 206, such that the ends of the cross bars 232 of the clamp halves 208 and 210 engage the cutouts 224 in the end walls 216 of the base 206. Once installed, the bores 234 in each of the clamp halves 208 and 210 are aligned with the respective bores 226 in the base 206. In addition, inner angled surfaces 222 of the base 206 mate with the outer surfaces 240 of the clamp halves 208 and 210.

Next, the pair of straps 212 are fit over the combined clamp halves 208 and 210. Bolts 214 are inserted through the straps and extend into the threaded bores 226 in the base. When the bolts 214 are tightened the clamp halves 208 and 210 are pulled into the base 206 until the cross bars 232 of the clamp halves bottom out in the cutouts 224 in the base 206. The engagement of the inclined end walls of the clamp valves with the inclined wall 222 of the base, cams the clamp halves into a tight, clamping engagement with the blade collar in both longitudinal and lateral directions. The straps are optional. The straps are used to force both clamp halves into the cutout. However, since the shelves 236 on each clamp half will force the other clamp half beneath it into the cutout, the straps are not necessary. Upon bottoming out, a press fit or interference fit is maintained between the clamp halves and the base. The press fit causes the shoulders 230 to engage the collar 204, but not the airfoil shaped portion of the blades element 21, such that a gripping force is produced to retain the first element 21 into position.

Now referring to FIG. 1, the friction welding process may start with the application of an initial forge load by the forge assembly 24, and then activation of the reciprocal motion assembly 26, or the reciprocal motion may be initiated prior to application of any forge load. Either way, the desired forge load and oscillating frequencies may be applied via the forge assembly 24 and the reciprocating motion assembly 26.

The forge load is directed along the forge axis $F_a$ normal to the motion axis $M_a$. It is preferred that the forge load be applied then released initially in order to force the clamp halves 208 and 210 further into the cutouts, prior to the tightening of fasteners 214. The forge load is then applied in order to start bonding. The forge load is applied by moving the disk 22 into contact with the blade 21, which is the loaded position. Oscillation of the blade 21 is achieved by activation of the hydraulic actuator assembly 90. This causes the slide 94, gripper 102, and the blade 21 to reciprocate along the motion axis $M_a$. During oscillation of the blade 21, the disk 22 is held stationary. As a result of the forge load clamp halves 208 and 210 are further urged into the base 206. Thus, the gripping force on the blade 21 and clamp halves due to the clamping of straps 212 is augmented by the forge load.

The application of the forge load and reciprocating load causes the bonding surfaces of the elements 21 and 22 to heat up due to friction, which plasticizes the metal components, which are then diffusion bonded by the forge loading. Upon completion of such friction weld, while the friction welder is in the loaded position, bolts 214 are removed from the gripper 102. The forge assembly 26 is then actuated, causing the disk 22 to move away from the diagonal truss 31, pulling the blade 21 now bonded to the second element 22, out of the gripper 102. Subsequent blades are bonded to the disk in the aforementioned manner. Once the entire intergrally bladed rotor is formed the collars 204 are machined off the blades.

The principle advantage to the present invention is that the gripper clamps the first element sufficiently to withstand the forces exerted by the friction welder, and holds the blade so that the final position of the blade is accurate and repeatable. In addition, the gripper supports the first element in such a way as to minimize the likelihood of the first element breaking and without altering its shape or introducing stress into it. Yet another advantage of the gripper is that it allows blades which are close together to be bonded since the gripper will not interfere with neighboring blades. Furthermore the gripper is easy to disengage from the bonded blade.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. One such modification is to bolt the clamp halves together prior to insertion into the gripper. This allows several blades to be set up at a time, prior to bonding, so that bonding can occur more quickly. It is therefore contemplated that the appended claims will cover any such modifications or embodiments that fall within the true scope of the invention.

What is claimed is:

1. A gripper for retaining a first element to a reciprocal motion assembly of a friction welder, said gripper being characterized by:
   a first clamp half having an inclined wall;
   a second clamp half having an inclined wall, engageable with said first clamp half such that when said halves are engaged to one another the clamp halves surround the first element;
   a base engageable with the motion assembly, said base including two end walls spaced apart to accommodate the clamp halves therebetween, at east one of said end walls being inclined such that upon insertion of the joined clamp halves in the base, the end walls thereof compress the clamp halves together by a camming together of said clamp halves by said engagement of said inclined walls on said base and clamp halves;
   whereby the clamp halves firmly grip the first element, so that the first element is securely held therewithin.

2. The gripper of claim 1 characterized by said end walls including cutouts therein, said cutouts being provided with inclined side surfaces, said clamp halves being received within said cutouts and including inclined side surfaces which mate with said side surfaces of said cutouts to cam said clamp halves together when inserted into said cutouts.

3. A gripper for retaining a first element to a reciprocal motion assembly of a friction welder, said gripper is characterized by:
   a substantially T-shaped first clamp half including a crossbar including an upper surface with a shoulder, and a perpendicular stalk including two longitudinally spaced outer surfaces;
   a substantially T-shaped second clamp half including a crossbar including an upper surface with a shoulder, and a perpendicular stalk including two longitudinally spaced outer surfaces, such that when the clamp halves are joined, the shoulders surround the first element;
   a U-shaped base engageable with the motion assembly, the base including two spaced end walls, each end wall including a cutout in the free end thereof, and an inner surface, the inner surfaces being spaced, so that upon insertion of the joined clamp halves in the base, the crossbars mate with the cut outs and the outer surfaces of the stalks mate with the inner surfaces of the cutouts such that the end walls compress the clamp halves both together;
   whereby the clamp halves firmly grip the first element, so that the first element is securely held therebetween.

4. The gripper of claim 3 characterized by said outer surfaces of said stalk and said inner surfaces of said cutouts are inclined such that said clamp halves are compressed together by a camming engagement of said outer surfaces of said stalks with said inner surfaces of said cutouts.

5. The gripper of claim 3 characterized by at least one of said end walls including an inclined inner surfaces, and said clamp half stalks including inclined surfaces which mate with said inclined end wall inner surfaces such that said clamp halves are compressed together by a camming engagement of said inclined stalk surface with said inclined end wall inner surfaces.

6. The gripper of claim 3, wherein the gripper is further characterized by:
   said first and second clamp halves being bored therethrough
   said base being bored in the base of each cutout, said cutout bores being in alignment with said clamp half bores; and
   a pair of fasteners receivable with said bores in said clamp halves and cutouts;
   whereby the fasteners compressively retain the clamp halves in the base.

\* \* \* \* \*